United States Patent
Loriette (10) Patent No.: US 12,118,751 B2
(45) Date of Patent: Oct. 15, 2024

(54) METHOD FOR IDENTIFYING A LIP-MAKEUP PRODUCT APPEARING IN AN IMAGE

(71) Applicant: CHANEL PARFUMS BEAUTE, Neuilly sur Seine (FR)

(72) Inventor: Jonathan Loriette, Neuilly sur Seine (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 383 days.

(21) Appl. No.: 17/545,536

(22) Filed: Dec. 8, 2021

(65) Prior Publication Data
US 2022/0180565 A1    Jun. 9, 2022

(30) Foreign Application Priority Data

Dec. 9, 2020    (EP) .................................... 20306519

(51) Int. Cl.
*G06T 7/90*          (2017.01)
*G06F 16/903*       (2019.01)
(Continued)

(52) U.S. Cl.
CPC .......... *G06T 7/90* (2017.01); *G06F 16/90335* (2019.01); *G06N 20/00* (2019.01);
(Continued)

(58) Field of Classification Search
None
See application file for complete search history.

(56) References Cited

U.S. PATENT DOCUMENTS

| 7,634,103 | B2 | 12/2009 | Rubinstenn et al. |
| 2011/0243426 | A1 | 10/2011 | Hu |

(Continued)

FOREIGN PATENT DOCUMENTS

| CN | 108053365 | 11/2019 | |
| CN | 112016621 A | * 12/2020 | ............. G06F 18/23 |

(Continued)

OTHER PUBLICATIONS

A. Dantcheva, C. Chen and A. Ross, "Can facial cosmetics affect the matching accuracy of face recognition systems?," 2012 IEEE Fifth International Conference on Biometrics: Theory, Applications and Systems (BTAS), Arlington, VA, USA, 2012, pp. 391-398, doi: 10.1109/BTAS.2012.6374605. (Year: 2012).*

(Continued)

*Primary Examiner* — Amandeep Saini
*Assistant Examiner* — Caroline T Duffy
(74) *Attorney, Agent, or Firm* — NIXON & VANDERHYE (57) ABSTRACT

Disclosed is a method for identifying a lip-makeup product from an image, the method including: detecting a mouth on the image; determining whether the mouth is made-up or not; and if the mouth of the person is made-up: determining color parameters of the lip-makeup of the image from at least some of the pixels of the image belonging to the mouth; computing a distance between the color parameters of the lip-makeup from the image and the color parameters of at least some of a plurality of reference lip-makeup products; and if at least one distance between the color parameters of the lip-makeup of the input image and one of the reference lip-makeup product is below a predetermined threshold, identifying a reference lip-makeup product best matching the lip-makeup product on the image.

17 Claims, 8 Drawing Sheets

(51) Int. Cl.
*G06N 20/00* (2019.01)
*G06Q 30/0251* (2023.01)
*G06Q 30/0601* (2023.01)
*G06T 7/40* (2017.01)
*G06V 10/74* (2022.01)
*G06V 10/762* (2022.01)
*G06V 10/774* (2022.01)
*G06V 40/16* (2022.01)

(52) U.S. Cl.
CPC ..... *G06Q 30/0251* (2013.01); *G06Q 30/0601* (2013.01); *G06T 7/40* (2013.01); *G06V 10/74* (2022.01); *G06V 10/763* (2022.01); *G06V 10/774* (2022.01); *G06V 40/161* (2022.01); *G06V 40/172* (2022.01); *G06T 2207/10024* (2013.01); *G06T 2207/20081* (2013.01); *G06T 2207/30201* (2013.01)

(56) References Cited

U.S. PATENT DOCUMENTS

| | | |
|---|---|---|
| 2014/0185931 A1 | 7/2014 | Aoki |
| 2019/0065831 A1 | 2/2019 | Shen et al. |
| 2019/0166980 A1 * | 6/2019 | Huang .................. G06Q 30/02 |
| 2019/0325616 A1 * | 10/2019 | Chhaya ................ G06V 40/167 |
| 2020/0134371 A1 * | 4/2020 | Charraud ............... G06V 10/82 |
| 2021/0056348 A1 * | 2/2021 | Berlin .................... G06T 11/60 |
| 2021/0056588 A1 | 2/2021 | Kim |

FOREIGN PATENT DOCUMENTS

| | | |
|---|---|---|
| CN | 114119154 A * | 3/2022 |
| EP | 2 131 697 | 12/2009 |
| EP | 3 447 726 | 2/2019 |
| EP | 3 491 963 | 6/2019 |
| JP | 2004-038918 A | 2/2004 |
| JP | 2011-181016 A | 9/2011 |
| JP | 2012-256130 A | 12/2012 |
| JP | 2020-522820 A | 7/2020 |
| KR | 102118042 B1 * | 6/2020 |
| KR | 20210091874 A * | 7/2021 |
| WO | 2008/108760 | 9/2008 |
| WO | 2015/127394 | 8/2015 |
| WO | 2017/149315 | 9/2017 |
| WO | WO-2020179329 A1 * | 9/2020 |

OTHER PUBLICATIONS

Tyagi, V. (2018). Understanding Digital Image Processing (1st ed.). CRC Press. https://doi.org/10.1201/9781315123905 (Year: 2018).*
Office Action issued in Japanese Patent Application No. 2021-195104 dated Feb. 7, 2023.
Rasti et al., "Makeup detection using Local Fisher Discriminant Analysis," 2015 7th Conference on Information and Knowledge Technology (IKT), IEEE, May 26, 2015, pp. 1-6.
Abe et al., "Recognition of Color" Color Picture Studied by Keiichi, Video Information Industrial, Japan, Industrial Hardware-for-Development Style, Nov. 1, 2003, vol. 35, No. 11, pp. 11-16, ISSN 1346-1362.
Nina DU, "Learning Lipstick Colors and Brands from Images (Computer Vision)", CS23ON reports, Jun. 30, 2020, 6 pages, http://cs230.stanford.edu/projects_spring_2020/reports/38916954.pdf.
Extended European Search Report for EP Application No. 20 30 6519 dated Jul. 1, 2021, 4 pages.

* cited by examiner

METHOD FOR IDENTIFYING A LIP-MAKEUP PRODUCT APPEARING IN AN IMAGE

This application claims priority to European Patent Application No. 20306519.8 filed Dec. 9, 2020, the entire contents of which are hereby incorporated by reference.

BACKGROUND OF THE INVENTION

Field of the Invention

The invention relates to a method and system for identifying a lip-makeup product from an input image, in order to recommend a corresponding lip-makeup product.

Description of the Related Art

When a customer is willing to select a lip-makeup product, it may be difficult to determine the rendering of the product once applied on the lips, from the color of the bulk product, or from a color displayed on the packaging of the product. Indeed, the color as well as the texture of the products may appear different once applied on the skin.

Conversely, when one sees an image of a person wearing lip-makeup product, said person readily gets the appearance of the lip-makeup product once spread on the lips. If the lip-makeup product is to the taste of the person, he or she may be willing to find a corresponding lip-makeup product and buy it. However, finding a matching product may not be easy for the reasons given above regarding the differences between the appearance of the product on the lips and the appearance of the bulk product or of its packaging.

There is therefore a need for a solution for determining a lip-makeup product from an image.

Solutions have been proposed for determining a foundation suitable for a user based on the skin color of the user. However these solutions are not applicable to the selection of a lip-makeup product since the aspect of such products on the lips is more complex to analyze, and lipsticks have specificities in terms of texture that do not apply to foundations.

It is also known from EP 3 447 726 an image analysis method in which the color of a lipstick is acquired and compared to a reference, but this analysis is only performed in order to assist a person in applying makeup.

Therefore, none of the methods disclosed above provides a solution to this problem.

SUMMARY OF THE INVENTION

It is a purpose of the invention to overcome the shortcomings of the prior art by providing a method for automatically identifying a lip-makeup product. In particular, an aim of the invention is to identify, among a database of reference lip-makeup products, the product that best corresponds to a lip-makeup product visible on an image.

Another aim of the invention is to ensure that the selected reference product is not only the closest match to the lip-makeup product visible on the image, but is also sufficiently similar to said lip-makeup product to be relevant for the customer.

To this end, it is disclosed a method for identifying a lip-makeup product from an input image, the method being implemented by a system comprising a computer and a memory storing, for each of a plurality of reference lip-makeup products, an identifier and color parameters, and comprising:
  detecting a mouth of a person on the input image,
  determining whether the mouth is made-up or not, and
  if the mouth of the person is made-up,
    determining color parameters of the lip-makeup of the input image from at least some of the pixels of the image belonging to the mouth,
    computing a distance between the color parameters of the lip-makeup from the image and the color parameters of at least some of the plurality of reference lip-makeup products, and
    if at least one distance between the color parameters of the lip-makeup of the input image and one of the reference lip-makeup product is below a predetermined threshold, identifying a reference lip-makeup product best matching the lip-makeup product on the image.

In embodiments, determining whether the mouth is made-up or not comprises implementing a binary classification model trained on a plurality of mouth images and configured to determine presence or absence of lip-makeup product.

In embodiments, identifying a reference lip-makeup product best matching the lip-makeup product on the image comprises implementing a classification model trained on a learning dataset comprising, for each reference lip-makeup product, a plurality of artificially generated images of faces wearing said reference lip-makeup product. In embodiments, the method further comprises determining a texture of the lip-makeup product of the image, and the step of computing a distance between the color parameters of the lip-makeup product of the image and the color parameters of the referenced lip-makeup products is performed only for the reference lip-makeup products having the same texture as the lip-makeup product of the image. In this case, the steps of determining a texture of the lip-makeup product and determining whether the mouth on the image is made-up or not may be performed simultaneously by implementing a trained model configured to output, from an input image representing a face, a category selected among a plurality of categories including absence of lip-makeup product and a plurality of textures of lip-makeup product.

In embodiments, determining color parameters of the lip-makeup of the input image comprises:
  selecting a set of pixels of the input image belonging to the mouth,
  removing black and white pixels from the set of pixels,
  implementing a k-means algorithm with a single cluster over the color parameters of the set of pixels, and determining the color parameters of the lip-makeup as the centroid of the color parameters of the set of pixels.

In embodiments, the color parameters of the reference lip-makeup products are obtained, for each reference lip-makeup product, by:
  performing virtual try-on of said lip-makeup reference product on a set of faces comprising a plurality of face images,
  for each obtained image,
    selecting a set of pixels belonging to the mouth,
    removing black and white pixels from the set of pixels,
    implementing a k-means algorithm with a single cluster over the color parameters of the set of pixels, thereby outputting a centroid, and
  determining the color parameters of the reference lip makeup product as a set comprising the color parameters of the centroid of each obtained image, and computing a distance between the color parameters of the lip-makeup from the image and the color parameters of at least some of the plurality of reference lip-makeup products, comprises, for each reference lip-makeup product for which a distance is computed, computing a distance between the color parameters of the lip-makeup product from the image and the color parameters of each centroid obtained for each obtained image.

In embodiments, the method further comprises a step of color correction of the input image prior to determining the color parameters of the lip-makeup product of the input image.

In embodiments, the method is implemented by a system further comprising an advertisements database comprising a plurality of advertisement images associated with respective reference lip-makeup products, wherein the method comprises a preliminary step of determining whether the input image corresponds to an advertisement image contained in the advertisement database and, if so, identifying the lip-makeup product on the input image as the reference lip-makeup product associated to said advertisement image.

In this case, determining whether the input image corresponds to an advertisement database may be performed by implementing a machine learning algorithm trained on a learning database comprising the advertisement images of the advertisement database and, for each advertisement image, a set of additional images artificially generated from the advertisement image by implementing at least one transformation of said advertisement image.

The transformations performed on each advertisement image for generating additional images may be one or a combination of:
  geometric deformations,
  modified background layer,
  screen-like distorsion,
  addition of shadow or sun-flare,
  color deviation.

In embodiments, the method comprises a preliminary step of receiving the input image from a user terminal, and further comprising, once a reference lip-makeup product corresponding to the lip-makeup product of the image is determined, sending a return message to the user terminal comprising an identification of the reference lip-makeup product.

In embodiments, the return message further comprises connection information suitable for accessing an e-shop selling said reference lip-makeup product, and/or a virtual try-on application for virtually trying said reference lip-makeup product.

According to another object, a lip-makeup identification system is disclosed, comprising a computer and a memory storing, for each of a plurality of reference lip-makeup products, an identifier and color parameters, the lip-makeup identification system being configured for implementing the method according to the above description.

According to another object, a method for requesting identification about a lip-makeup product, implemented by a user terminal comprising a computer and a camera is disclosed, said method comprising:
  acquiring an image,
  transmitting to a lip-makeup identification system the acquired image and a request for identifying a lip-makeup product appearing on the acquired image, and
  receiving, in response to said request, one among the following:
    an indication of the lip-makeup product appearing on the image,
    an indication that no lip-makeup product has been found in the image, or
    an indication that no corresponding lip-makeup product has been identified.

According to another object, it is disclosed a user terminal comprising a computer and a camera, configured for implementing the method for requesting identification recited above.

It is also disclosed a computer program product comprising code instructions for implementing any of the methods disclosed above, when it is executed by a computer.

The method disclosed above enables identifying, among a database of reference lip-makeup products, the one that best corresponds to a lip-makeup product visible on the image. This method is also able to determine whether a lip-makeup product is actually visible on the image, in order not to give any product reference if the input picture shows a mouth devoid of makeup.

Moreover, by comparing a distance between colorimetric parameters of the product visible on the image and the colorimetric parameters of the reference lip-makeup products with a determined threshold, the method ensures that only reference products that are sufficiently close to the target makeup product will be proposed. In what follows "target makeup product" may be used to designate the lip-makeup product visible on the processed image, or input image.

If the target makeup product is too remote from the reference products, then no reference product is identified. Accordingly, the customer is not disappointed by receiving a supposedly "matching" reference lip-makeup product which does not precisely corresponds to the product shown in the image.

BRIEF DESCRIPTION OF THE DRAWINGS

Other features and advantages of the invention will be apparent from the following detailed description given by way of non-limiting example, with reference to the accompanying drawings, in which.

DESCRIPTION OF THE PREFERRED EMBODIMENTS

A method for identifying a lip-makeup product from an input image will now be described.

Figure 3:
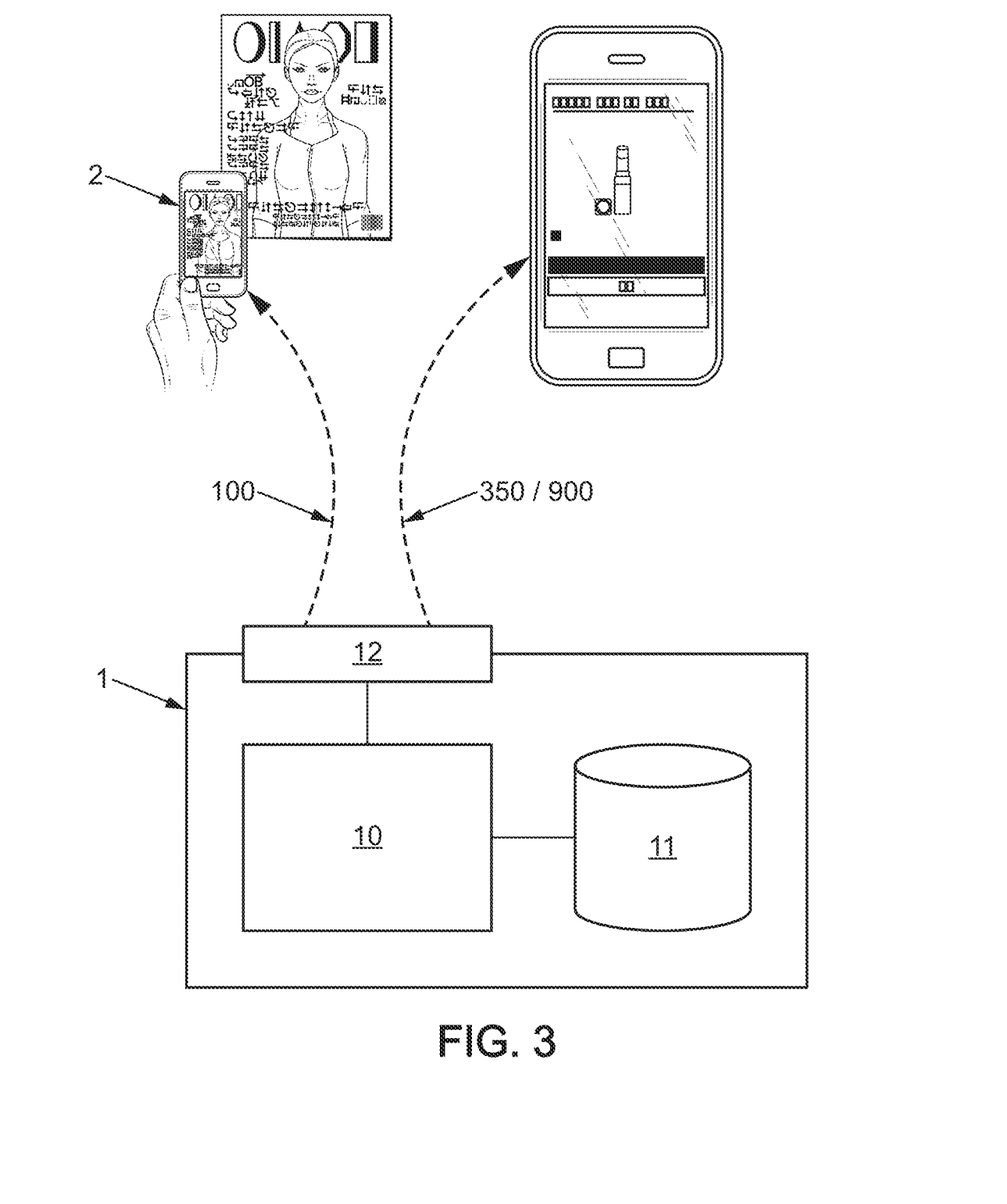
FIG. 3 schematically represents a system for identifying a lip-makeup product.

With reference to FIG. 3, this method may be implemented by a lip-makeup identification system 1, comprising a computer 10 and a memory 11. The computer may be any suitable kind of processing device, including one or several computer processing unit(s) CPU, one or several graphical processing unit(s) GPU, microprocessor(s), controller(s), microcontroller(s) etc.

The memory 11 stores code instructions which can be executed by the computer 10 for implementing the lip-makeup product identification method. The memory 11 may also store a database of reference lip-makeup products comprising, for each reference lip-makeup product, at least an identifier and color parameters of said product. The database may also store, for each reference lip-makeup product, a list of advertisement images in which said product appears. The memory 11 may also store a number of trained machine learning models that can be executed during implementation of the lip-makeup identification method, as will be described in more details below.

In other embodiments, said database may be stored in a memory distinct from the memory 11 of the system 1. For instance it may be stored in a remote server that the system 1 may access through a telecommunication network.

The system 1 in any case comprises an interface 12 for connecting to a telecommunication network and enabling the system 1 to receive messages from a plurality of user's personal terminals 2, and send messages thereto. A user's personal terminal 2 may be for instance a mobile phone or a digital tablet, comprising at least a processor and memory, a camera, and an interface for connecting to a telecommunication network, by means for instance of a wireless access network such as a mobile network of the type GSM, UMTS, LTE, 3G, 4G, 5G etc.

Figure 1:
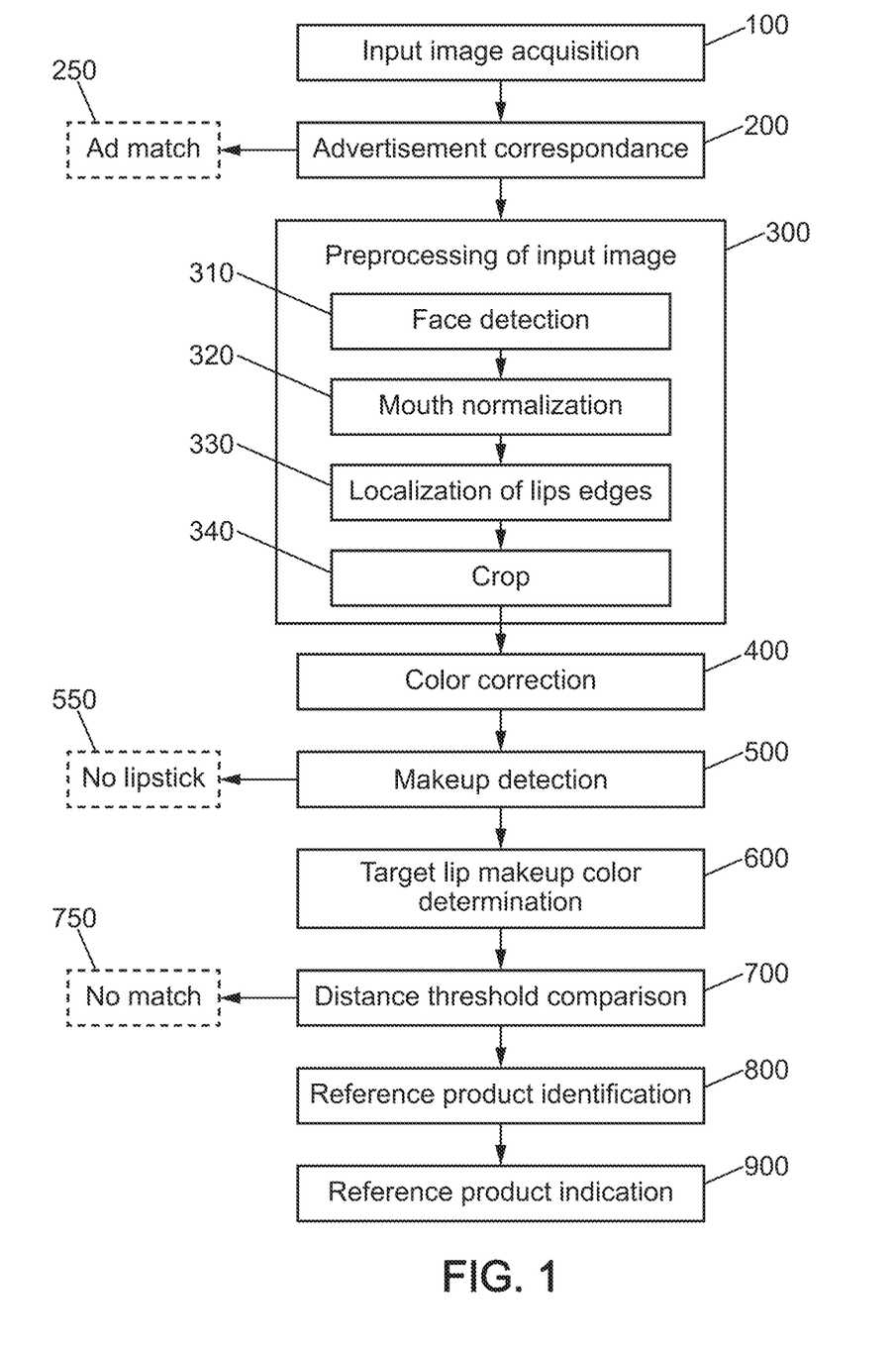
FIG. 1 schematically represents the main steps of a method for identifying a lip-makeup product from an input image according to an embodiment.
Figure 2:
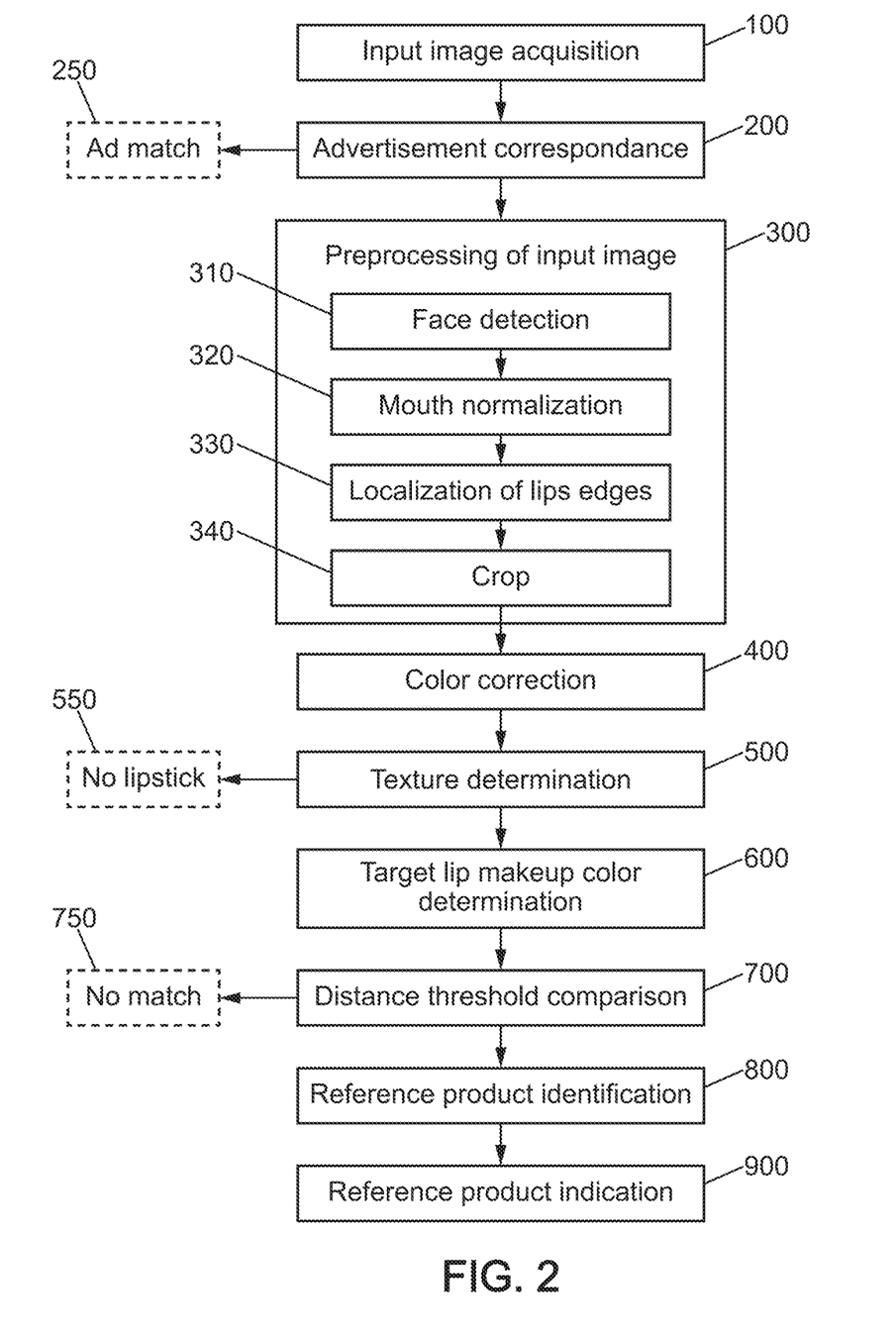
FIG. 2 schematically represents the main steps of a method for identifying a lip-makeup product from an input image according to another embodiment.

With reference to FIGS. 1 and 2, two exemplary embodiments of a method for identifying a lip-makeup product on an image will now be disclosed.

A typical situation is that of a user seeing a picture representing a person wearing a lip-makeup product that is of interest for the user. The user may, using its personal terminal 2, acquire an image of this picture and send the acquired image to the system 1 for identifying the displayed lip-makeup product. To this end, the user may use a dedicated app downloaded on its personal terminal, or upload the picture on a dedicated website.

The system 1 receives an input image at step 100, which corresponds to the image acquired by the user. In other embodiments, the input image 100 may be directly acquired by the system 1, which means that it is the same device which performs acquisition of the input image and identification of the lip makeup product visible on the image. In this case for instance the system 1 and user terminal 2 may form a single device.

In embodiments, the system 1 also implements a face detection algorithm on the image to check that a face is indeed visible in the input image prior to performing the subsequent steps of the method.

In some embodiments, the system 1 comprises an advertisements database comprising a plurality of advertisement images associated with respective reference lip-makeup products, and the method may comprise a step 200 of detecting whether the input image corresponds to an advertisement of the advertisement database. If so, the lip-makeup product appearing on the input image may be immediately identified as the reference lip-makeup product associated to the advertisement. The system 1 may then provide a message 250 to the user identifying said reference lip-makeup product and may also display the corresponding advertisement image. In that way, if the user acquires a picture of an advertisement that he has found in the street, or in a magazine or on the internet, he may immediately identify the lip-makeup product used in the advertisement.

This detection is performed by implementing a machine learning algorithm configured to determine whether the input image corresponds to an advertisement image of the advertisement database.

However, an advertisement database may not contain enough images to efficiently train a machine learning algorithm. Moreover, the user may acquire an image of the advertisement in various conditions, including various lighting conditions, various viewing angles, etc., and the machine learning algorithm has to be robust to such varying acquisition conditions.

In order to overcome these problems, said machine learning algorithm is trained on a dedicated database, which comprises, in addition to the advertisement images of the advertisement database, a number of images artificially generated from said advertisement images, by implementing at least one transformation on said advertisement images.

In embodiments, the transformations implemented on the advertisement images are selected in order to imitate the various acquisition conditions of the input image by the user.

Each transformation of the initial advertisement image may include one or a combination of:

At least one geometric transformation, comprising for instance a rotation, simulating a perspective or cropping the initial advertisement image, A modification of the background layer, by diminishing the image to background ratio, and replacing the background by either a uniform color or a random image selected among a library of background images, including for instances images of landscapes, streets, vehicles, furniture, etc.

A change in the colors of the initial advertisement image by adding a color mask layer and/or color jitter on a determined color channel.

A simulation of a shadow or sun-flare,

A simulation of a screen-like distortion stripes (Moiré effect) appearing on a picture of computer or mobile phone screen or TV screen, which is a set of lines appearing on a picture of a computer's screen. Said distortion may be simulated by simulating apparition of a grid on the advertisement image and performing elastic deformation of said grid.

In embodiments, for each initial advertisement image, at least a hundred, and preferably at least several hundreds of images are generated by implementing these transformations.

Figure 5A:
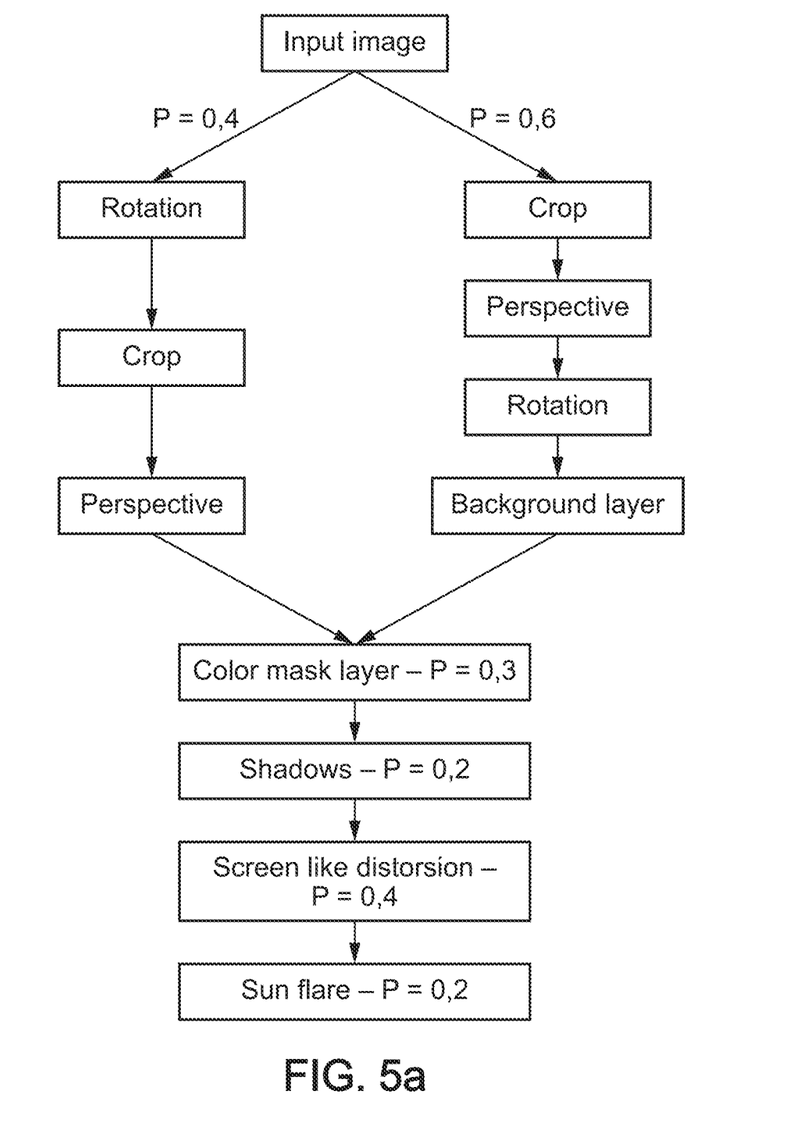
FIG. 5a shows exemplary transformation that may be implemented on the input image in order to build a learning database for a model configured to detect an advertisement from the input image.

In embodiments, each type of transformation may be implemented according to a fixed probability and the images generated from an initial advertisement image are automatically generated in accordance with the probabilities associated to each transformation. With reference to FIG. 5a, is shown a non-limiting and schematic example of a tree showing a number of applicable transformations and their associated probabilities. In addition, the parameters of each transformation may also be randomly selected among a predefined range (for instance rotation angle, crop percentage, etc.)

Figure 5B:
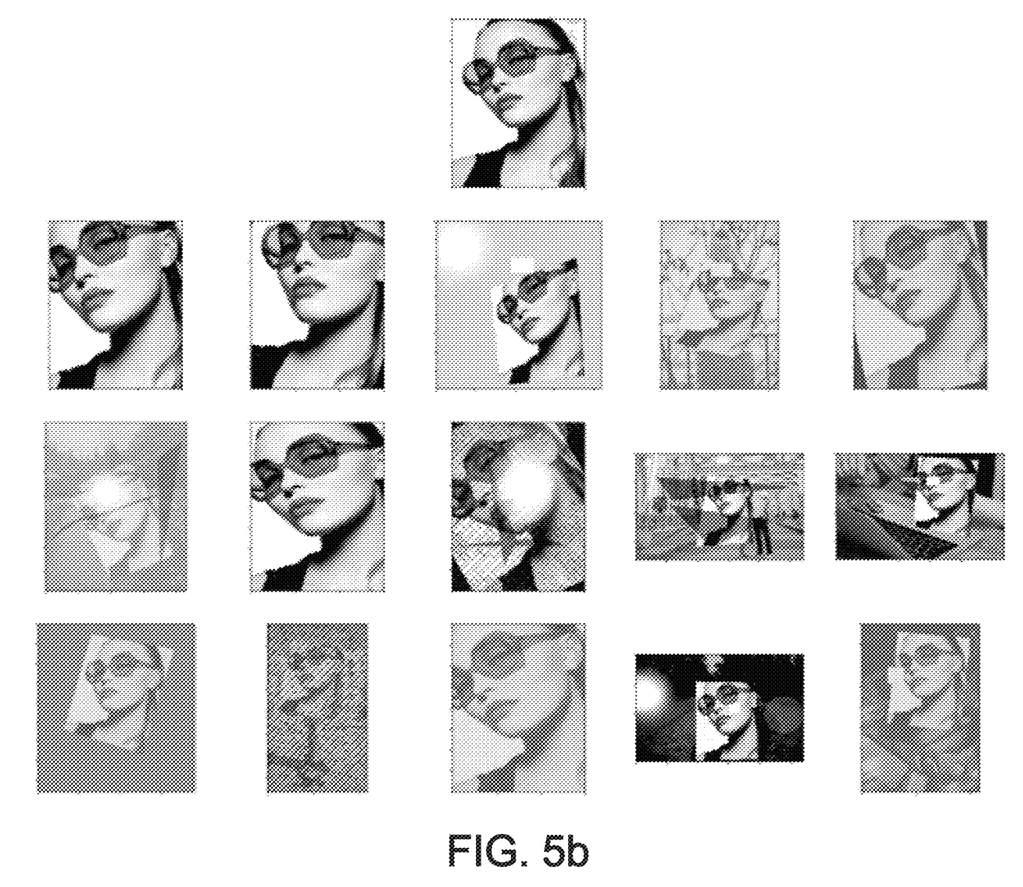
FIG. 5b shows an example of a set of generated images for training a classifier configured to determine whether the input image corresponds to an advertisement image.

With reference to FIG. 5b are shown some examples of images generated automatically from an initial advertisement.

Accordingly a database can be obtained for training a machine learning algorithm configured to receive as input the input image and to output:

An identification of an advertisement image detected within the input image, and/or an identifier of a reference lip-makeup product corresponding to said advertisement image, or, An output indicating that the input image does not correspond to any advertisement image of the advertisement database.

Said machine learning algorithm may for instance be a convolutional neural network (CNN), for instance of the type resnet or mobilenet. For this type of network, the last layer of the resnet or mobilenet structure may be replaced by a fully connected layer. Optionally, a softmax layer may also be added in order to compute probabilities for all the outputs. The highest probabilities can then be compared to a determined threshold to ensure that the probability is high enough to effectively correspond to an advertisement. If the highest probability is not high enough, the input image will not be determined to correspond to an advertisement.

If the step of detecting an advertisement in the input image and identifying the lip-makeup product from said advertisement is not implemented, or if no advertisement is detected, the method then comprises a preprocessing 300 of the input image for subsequent treatments of said image. The preprocessing aims at extracting the part of the image containing the mouth of the person visible on the image. A schematic example of such a preprocessing is shown with reference to FIGS. 4a to 4d. The preprocessing 300 of the input image may comprise implementing a face detection algorithm 310, such as a region-based convolutional neural network of the type disclosed in the article of R. Shaoqing et al. "Faster R-CNN: Towards Real-Time Object Detection with Region Proposal Networks", in Computer Vision and Pattern Recognition, arXiv: 1506.01497, 2016, or a Viola-Jones object detection algorithm, or any other face detection algorithm known by the skilled person.

Figure 4A:
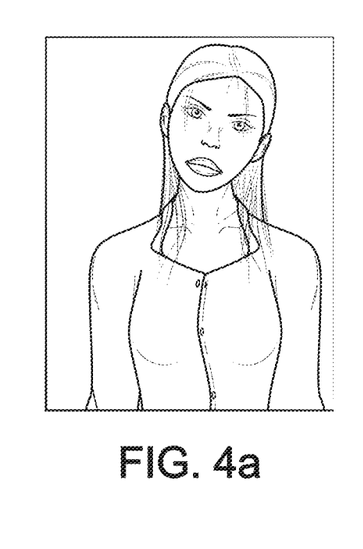
FIGS. 4a to 4d represents an example of preliminary processing of an input image.
Figure 4B:
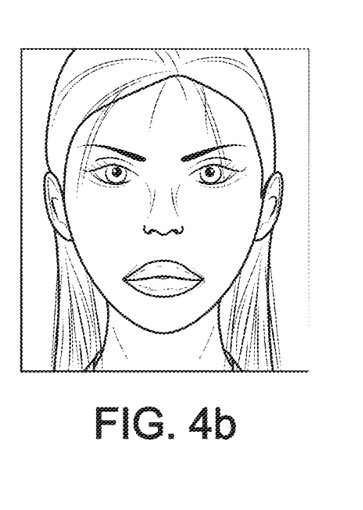

The preprocessing 300 then comprises, with reference to FIGS. 4a and 4b, normalizing 320 the image of the face of the person so that the face appearing in the image has a predefined size and has a predefined orientation. Accordingly, all input images processed in the lip-makeup identification method always have the same size and orientation, which allows the algorithms subsequently implemented on the image to exhibit higher performances and require less computation. The orientation of the face may be defined as the angle formed between a line extending between two corners of the eyes and the horizontal, preferably a line extending between the outer corners of the eyes and the horizontal.

This normalization may be performed by detecting the corners of the eyes, manually or using a face landmarks detection algorithm, and pivoting the image using an affine rotation matrix that simultaneously rotates the image of a desired angle, and brings the image to a determined scale in order to reach a target dimension. The target dimension may be a target width of the head on the image.

Figure 4C:
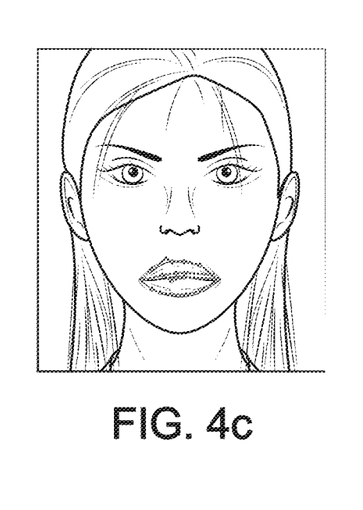
Figure 4D:
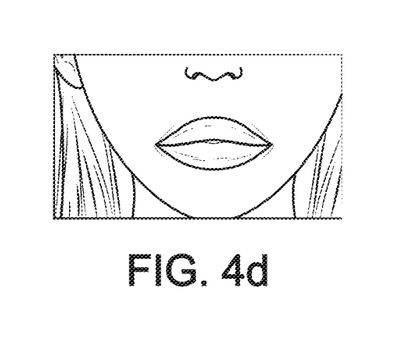

The preprocessing then comprises, as shown in FIG. 4c, locating the edges of the lips 330 on the image. This step may be achieved by implemented a face landmarks detection algorithm on the image. The face landmarks detection algorithm may be selected, for example, among the algorithms disclosed in the following publications:

V. Kazemi and al. "One Millisecond Face Alignment with an Ensemble of Regression Trees" 2014 IEEE Conference on Computer Vision and Pattern Recognition, Columbus, OH, 2014, pp. 1867-1874. doi: 10.1109/CVPR.2014.241;

R. Valle and al. "A Deeply-initialized Coarse-to-fine Ensemble of Regression Trees for Face Alignment".

Alternatively, if a face landmarks detection algorithm has been implemented for locating the corners of the eyes in substep 320, one can infer the location of the points at the edges of the mouth after normalization of the face image by applying, to the landmarks located at the edges of the mouth output by the algorithm, the rotation and scale parameters of the affine rotation matrix used for normalizing the face image.

The input image is then cropped during a substep 340, an example of which is shown on FIG. 4c, to keep only the part of the mouth shown in the input image. The cropped part may then be resized in order to have a fixed size for the subsequent processing. The result of the preprocessing 300 is therefore a picture of fixed size, centered on a mouth of a person.

The lip makeup product identification then comprises steps aiming at determining the reference lip-makeup product that is closest to the one appearing on the input image. To this end, a color correction 400 may be implemented on the part of the input image resulting from the preprocessing 300 or, more preferably, on the entire input image, in order to have color information about the whole face of the person. Indeed, the conditions of acquisition of the input image may alter the rendering of the color in the input image. This may be caused by the ambient lighting conditions, or by alterations caused by the magazine paper if the input image is an image of a page of a magazine. The color correction 400 may for instance comprise extending the color histogram of each color channel of the input image. For instance, if the color channels of the image are red, green and blue, each pixel can exhibit a value between 0 and 255 in each color channel. The color correction may comprise detecting the minimum and maximum values (for instance A and B, comprised between 0 and 255) of the pixels of the input image in each color channel, and providing a correction such that the minimum value A is replaced by 0, the maximum value B is replaced by 255, and all the values initially comprised between A and B are recomputed in order to keep the same proportion. For instance a value C may be recomputed into $C'=C*255/(B-A)$.

Furthermore, the color correction may also comprise converting the colorimetric domain of the image into the HSV domain, expressing hue H, saturation S and lightness L, and performing the same extension regarding the saturation values of the pixel, in order to extend the saturation channel as much as possible.

In other embodiments, other color correction techniques may be implemented, including machine learning-based techniques. One can for instance refer to the publication by M. Afifi, "Semantic White Balance: Semantic Color Consistancy Using Convolutional Neural Network", arXiv: 1802.00153v5 [cs.CV] 31 May 2019.

The method then comprises a step of determining 500 whether the mouth visible on the input image wears lip makeup or not.

In an embodiment shown in FIG. 1, this step is performed by implementing a binary classifier configured to receive as input the input image, preferably after having performed the preprocessing 300 and the color correction 400, and to output either an indication that a lip-makeup is worn or an indication that no lip-makeup is worn. Said classifier may be a Convolutional Neural Network (CNN), for instance a Resnet or Mobilenet network adapted for this use. In particular, a Resnet network may be used, in which the last layer is removed and replaced by a fully connected layer having two outputs (corresponding respectively to "lip makeup" or "no lip makeup").

Said CNN may be trained by supervised learning on a learning database formed of at least thousands of mouth images wearing makeup or not. Each image used for the training may be obtained by implementing the same preprocessing 300 as disclosed above on an initial face image. Preferably, the learning database comprises in roughly equal proportions images of people wearing lip makeup and images of people not wearing makeup.

In an alternative embodiment shown in FIG. 2, step 500 may be a step of determining the texture of a lip-makeup product covering the mouth visible in the input image, among a plurality of textures including absence of lip-makeup product and a number of lip-makeup textures. For instance, said lip-makeup textures may include:

Matte,
Bright,
Glossy.

Figure 6:
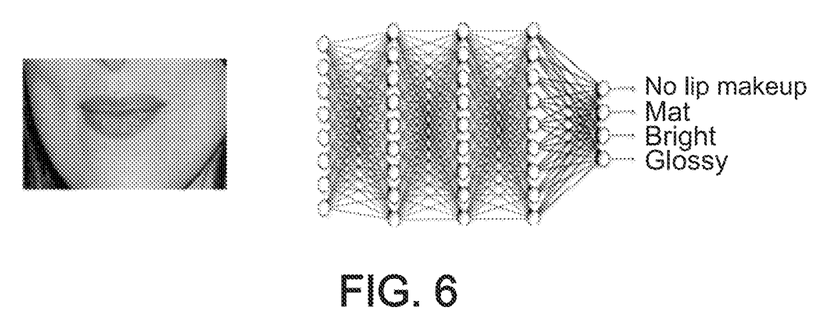
FIG. 6 schematically represents an example of texture classifier.

As shown schematically in FIG. 6, texture determination may be implemented using a classifier configured to receive as input the input image, preferably after having performed the preprocessing 300 and the color correction 400, and to output an indication of the texture of the lipstick among the plurality of textures given above, including absence of make-up.

Said classifier may be a CNN, as earlier it may be a Resnet or Mobilenet network in which the last layer has been replaced by a fully connected layer having the desired outputs (one output per texture).

This model may also be trained by supervised learning, using a learning database formed of at least several thousands of mouth images (obtained from face images by implementing the preprocessing 300 disclosed above) and annotated in order to indicate, for each mouth image, the texture of the lip-makeup product visible on the image, or to indicate absence of lip-makeup. Preferably, the images from the learning database may represent all the possible textures in approximately the same proportions.

If it results from step 500 that no makeup is worn by the person visible on the input image, the system 1 may send to the user having transmitted the input image a notice 550 informing that there is no lip makeup on said image.

In the other cases, the method then comprises a step 600 of determining the color parameters of the lip-makeup product appearing in the input image.

Figure 7:
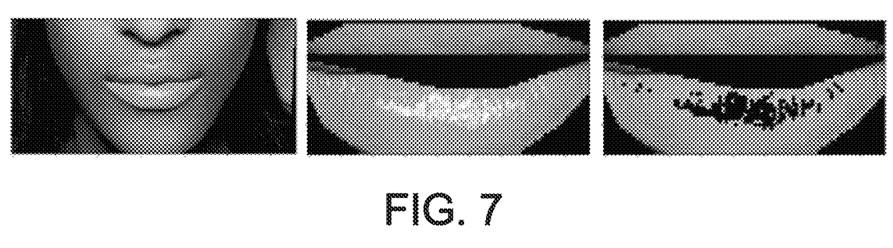
FIG. 7 represents the selection of mouth pixels to determine color parameters of the lip makeup product visible on the input image.
Figure 8:
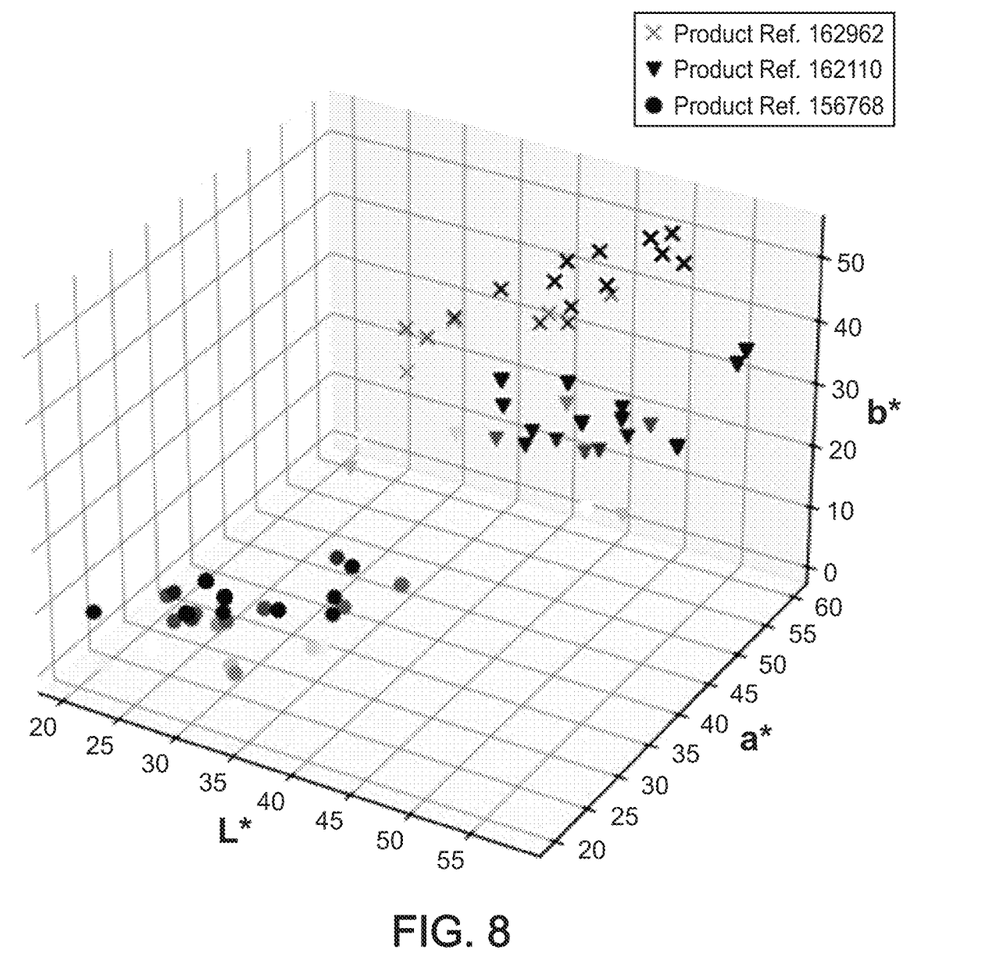
FIG. 8 represents an illustration of color parameters of a plurality of lip makeup products.

With reference to FIG. 7, these color parameters may be determined by selecting a set of pixels of the input image belonging to the mouth. To do so, the landmarks indicating the edges of the lips during preprocessing 100 are reused and the pixels that belong to the lips are selected. This is shown in the second image of FIG. 7. Then, a range of white pixels and black pixels are removed from this subset, since white pixels can correspond to teeth or to the reflection of a camera flash, and black pixels can correspond to the edges of the lips. The resulting set of pixels is shown in the third image of FIG. 7.

A k-means algorithm with a single cluster is then implemented over the color parameters of the remaining set of pixels. Said color parameters may be expressed in the RGB colorimetric domain or CIE L*a*b* colorimetric domain. The color parameters of the lip-makeup product then correspond to the color parameters of the centroid of the color parameters of the set of pixels, said centroid being output by the k-means algorithm.

The method may then comprises computing 700 a distance between the color parameters of the lip-makeup appearing in the input image and the color parameters of at least some of the reference lip-makeup products of the database, to determine whether at least one reference lip-makeup product of the database has a distance with the color parameters of the lip-makeup from the image below a predetermined threshold. This step allows checking that the lip-makeup product on the input image belongs to a range of colors that exists within the reference lip-makeup product database, and that the result of the identification method will not output a reference lip-makeup product that would be too remote from the target lip-makeup product.

For instance, the Chanel lip-makeup product database corresponds to the set of lip-makeup products that are sold by Chanel. This database does not comprise any green lip-makeup product. Accordingly, if an input image representing a mouth madeup with a green lipstick is acquired, step 600 will result in an indication that no lip-makeup product from the Chanel reference database has a distance with the color parameters of the green lipstick below the predetermined threshold, and that hence no lip-makeup product among the Chanel reference database corresponds to the lipstick visible on the input image.

In the embodiment of the method wherein step 500 comprises determining a texture of the lip-makeup product, step 600 may be implemented only for a subset of reference lip-makeup products having the same texture as the one which has been determined during step 500 for the makeup product appearing in the input image.

Regarding the color parameters of the reference lip-makeup products, these parameters may be previously known as a color description of each reference lip-makeup product.

However, for more relevant color parameters, color parameters may be extracted from images of mouths wearing each reference makeup product. Said images can be obtained by acquiring images of people actually wearing each reference makeup product or they may be generated by performing virtual try-on of each reference makeup product on a plurality of face images.

It is here included within the meaning of virtual try-on, algorithms that select a pixels corresponding to the mouth of the person and replace those pixels by pixels simulating the rendering of a makeup product.

It is also included within the meaning of virtual try-on, implementation of deep learning generative models, such as GAN (Generative Adversarial Networks) or VAE (Variational Auto-encoders), configured for transferring a makeup style from one image to another. One can refer for instance to the publication by H. Chang and al. "Paired Cycle GAN: Asymmetric Style Transfer for Applying or Removing Makeup", CVPR 2018, June 2018.

In any case, the images are subject to the preprocessing of step 300 and to the same process of pixels selection as disclosed above with reference to FIG. 7. Then, a first k-means algorithm with a single cluster is implemented for each image, and the centroid output by the algorithm corresponds to color parameters of the reference lip makeup product for the corresponding image.

Eventually, each reference lip makeup product is represented by a set comprising the color parameters of the centroid of each image showing the application of said reference product. Accordingly, if N images are used for acquiring the color parameters of a reference lip-makeup product, this product will be represented by N points.

The computation of a distance between the color parameters of the target lip-makeup product and a reference product thus comprises computing a distance between the color parameters of the target lip-makeup product and the color parameters obtained for each image representing application of the reference lip-makeup product. With the example given above of N images representing a reference lip-makeup product, N distances are computed.

If the color parameters are expressed in a colorimetric domain, such as RGB or CIEL*a*b* color space, a distance may be computed as the quadratic sum of the differences between each color components. Alternatively, a distance such as CIE DE2000 or CIE94 may be implemented, as those distances are better representative of color discrepancies evaluated by a human eye.

Once each distance is computed, it is determined whether, for at least one reference make-up product, at least one distance, between the target lip-makeup product and one of the points obtained for the reference makeup product, is less than a predetermined threshold. If not, the lip makeup identification system 1 may return a message 750 to the user indicating that no reference make-up product corresponding to the one visible on the input image may be found.

In embodiments, the threshold may be determined as follows. A set of mouth images exhibiting a variety of colors, including colors which are not represented within the set of reference lip-makeup products (blue, white, green . . . ) is used. For each image, a distance between the color parameters of the mouth and the color parameters of the reference products is computed according to the description above, and the smallest distance is selected for image of the set. Then, the threshold can be set as the smallest distance obtained among the colors which are not represented in the set.

Thus, all the images showing a color which is not represented among the reference lip-makeup products have a distance greater than said threshold.

In the other case, the method then comprises a step 800 of identifying, among the reference lip-makeup product database, the one that best corresponds to the lip-makeup product visible on the input image.

According to a first embodiment of this step 800, the identified reference lip-makeup product may be the one which color parameters have the smallest distance with the color parameters of the lip-makeup product visible on the input image. This embodiment may preferably be used if the method comprises a step of texture determination of the lip-makeup product in the image. Indeed, in that case the number of computed distances can be reduced to only the number of reference lip-makeup product that have the same texture as the target product. Moreover, in that case color and textures are determined, which provides good precision to the identification method.

According to another embodiment, the identification of the best matching reference lip-makeup product may be performed using a classification model that is trained to output directly, for each reference makeup product, a probability of corresponding to the lip-makeup product visible on the input image. The reference makeup product exhibiting highest probability is selected as the one corresponding to the target product.

Said model may be configured to receive as input a mouth image (obtained at the output of the preprocessing step 100 or more preferably of the color correction step 400) and to output a selected one of all the reference makeup products of the reference products database. This model may be a convolutional neural network, for instance of the Resnet type in which the last layer is replaced by a fully connected layer having a number of outputs equal to the number of reference makeup products. The selected reference makeup product is then the highest output value of the network.

Optionally, a Softmax layer may be assed, in order to compute probabilities for each output. This may be used for instance for comparing the highest output or outputs to a threshold probability, and selecting as corresponding reference lip makeup product a plurality of products for which the corresponding probability is above said threshold.

This model may be trained on a learning database comprising, for each reference lip-makeup product, a plurality of images of faces wearing said reference lip-makeup product. These images may be actual images of people wearing each reference lip-makeup product, but in preferred embodiments, they may be artificially generated images.

Artificially generated images can be generated by performing virtual try on of each reference makeup product. Here again virtual try on is also understood as encompassing the generation of images using generative deep learning networks. In that case, it is not necessary to determine the texture of the target product in step 500 since this type of model may directly output the best matching reference lip-makeup product. However, if step 500 does comprise texture determination, then the selection of the reference lip makeup product corresponding to the target product comprises selecting, among the reference products having the same texture as the target product, the one exhibiting highest correspondence probability, without considering the other reference products' probabilities.

Once a reference makeup product is identified, the system 1 may provide an indication of said product in a response message 900. This response message may also comprise connection information, such as a hyperlink, suitable for accessing an e-shop selling said reference product. The response message 900 may also comprise connection information for accessing a virtual try-on application for virtually trying said reference lip-makeup product.

As explained above, the identification method according to the present disclosure can be implemented in a variety of different manners, depending on which steps are implemented and how they are implemented.

According to a preferred implementation, steps 100, 200, 300 and 400 are implemented. Then, step 500 is implemented by using a classifier outputting only whether or not the mouth appearing on the input image wears makeup. Then, steps 600 to 800 are implemented. The implementation of step 800 is the one disclosed above using the classification model configured to identify the reference lip-makeup product most similar to the target product.

According to a second preferred implementation, steps 100 to 400 are implemented. Then step 500 is implemented by using the texture classifier. Then steps 600 to 800 are implemented and the implementation of step 800 is performed by selecting, among the reference makeup products having the texture identified at step 500, the one having smallest distance with the color parameters of the lip-makeup product appearing on the input image.

The invention claimed is:

1. A method for identifying a lip-makeup product from an input image, the method being implemented by a system comprising a computer and a memory storing, for each of a plurality of reference lip-makeup products, an identifier and color parameters, and comprising:
   detecting a mouth of a person on the input image,
   determining whether the mouth is made-up or not, and
   if the mouth of the person is made-up, determining color parameters of the lip-makeup of the input image from at least some of the pixels of the image belonging to the mouth, computing a distance between the color parameters of the lip-makeup from the image and the color parameters of at least some of the plurality reference lip-makeup products, and if at least one distance between the color parameters of the lip-makeup of the input image and one of the reference lip-makeup product is below a predetermined threshold, identifying a reference lip-makeup product best matching the lip-makeup product on the image, wherein identifying a reference lip-makeup product best matching the lip-makeup product on the image comprises implementing a classification model trained on a learning dataset comprising, for each reference lip-makeup product, a plurality of artificially generated images of faces wearing said reference lip-makeup product.

2. The lip-makeup identification method according to claim 1, wherein identifying a reference lip makeup product best matching the lip-makeup product on the image comprises implementing a classification model configured to receive as input a mouth image and to output a selected one of all the reference lip-makeup products.

3. The lip-makeup identification method according to claim 1, wherein determining whether the mouth is made-up or not comprises implementing a binary classification model trained on a plurality of mouth images and configured to determine presence or absence of lip-makeup product.

4. The lip-makeup identification method according to claim 1, wherein determining color parameters of the lip-makeup of the input image comprises:

selecting a set of pixels of the input image belonging to the mouth, removing black and white pixels from the set of pixels, implementing a k-means algorithm with a single cluster over the color parameters of the set of pixels, and determining the color parameters of the lip-makeup as the centroid of the color parameters of the set of pixels.

5. The lip-makeup identification method according to claim 1, wherein the color parameters of the reference lip-makeup products are obtained, for each reference lip-makeup product, by:

performing virtual try-on of said lip-makeup reference product on a set of faces comprising a plurality of face images, for each obtained image, selecting a set of pixels belonging to the mouth, removing black and white pixels from the set of pixels, implementing a k-means algorithm with a single cluster over the color parameters of the set of pixels, thereby outputting a centroid, and determining the color parameters of the reference lip makeup product as a set comprising the color parameters of the centroid of each obtained image, and computing a distance between the color parameters of the lip-makeup from the image and the color parameters of at least some of the plurality of reference lip-makeup products, comprises, for each reference lip-makeup product for which a distance is computed, computing a distance between the color parameters of the lip-makeup product from the image and the color parameters of each centroid obtained for each obtained image.

6. The lip-makeup identification method according to claim 1, further comprising a step of color correction of the input image prior to determining the color parameters of the lip-makeup product of the input image.

7. The lip-makeup identification method according to claim 1, comprising a preliminary step of receiving the input image from a user terminal, and further comprising, once a reference lip-makeup product corresponding to the lip-makeup product of the image is determined, sending a return message to the user terminal comprising an identification of the reference lip-makeup product.

8. The lip-makeup identification method according to claim 7, wherein the return message further comprises connection information suitable for accessing an e-shop selling said reference lip-makeup product, and/or a virtual try-on application for virtually trying said reference lip-makeup product.

9. A lip-makeup identification system, comprising a computer and a memory storing, for each of a plurality of reference lip-makeup products, an identifier and color parameters, the lip-makeup identification system being configured to be capable of implementing the method according to claim 1.

10. A method for requesting identification about a lip-makeup product, implemented by a user terminal comprising a computer and a camera, and a lip-makeup-identification system comprising a computer and a memory storing, for each of a plurality of reference lip-makeup products, an identifier and color parameters, said method comprising:

the user terminal acquiring an image, the user terminal transmitting to the lip-makeup identification system the acquired image and a request for identifying a lip-makeup product appearing on the acquired image, the lip-makeup identification system implementing on said image the method according to claim 1, and the user terminal receiving from the lip-makeup identification system, in response to said request, one among the following:

an indication of the lip-makeup product appearing on the image indication that no lip-makeup product has been found in the image, or indication that no corresponding lip-makeup product has been identified.

11. A non-transitory computer-readable medium on which is stored a computer program comprising code instructions which, when executed by a computer, cause the computer to perform the method according to claim 1.

12. A method for identifying a lip-makeup product from an input image, the method being implemented by a system comprising a computer and a memory storing, for each of a plurality of reference lip-makeup products, an identifier and color parameters, and comprising:

detecting a mouth of a person on the input image, determining whether the mouth is made-up or not, and if the mouth of the person is made-up, determining color parameters of the lip-makeup of the input image from at least some of the pixels of the image belonging to the mouth, computing a distance between the color parameters of the lip-makeup from the image and the color parameters of at least some of the plurality of reference lip-makeup products, and if at least one distance between the color parameters of the lip-makeup of the input image and one of the reference lip-makeup product is below a predetermined threshold, identifying a reference lip-makeup product best matching the lip-makeup product on the image, further comprising determining a texture of the lip-makeup product of the image, and the step of computing a distance between the color parameters of the lip-makeup product of the image and the color parameters of the referenced lip-makeup products is performed only for the reference lip-makeup products having the same texture as the lip-makeup product of the image.

13. The lip-makeup identification method according to claim 12, wherein the steps of determining a texture of the lip-makeup product and determining whether the mouth on the image is made-up or not are performed simultaneously by implementing a trained model configured to output, from an input image representing a face, a category selected among a plurality of categories including absence of lip-makeup product and a plurality of textures of lip-makeup product.

14. A lip-makeup identification system, comprising a computer and a memory storing, for each of a plurality of reference lip-makeup products, an identifier and color parameters, the lip-makeup identification system being configured to be capable of implementing the method according to claim 12.

15. A method for identifying a lip-makeup product from an input image, the method being implemented by a system comprising a computer and a memory storing, for each of a plurality of reference lip-makeup products, an identifier and color parameters, and comprising:
   detecting a mouth of a person on the input image,
   determining whether the mouth is made-up or not, and
   if the mouth of the person is made-up,
      determining color parameters of the lip-makeup of the input image from at least some of the pixels of the image belonging to the mouth,
      a distance between the color parameters of the lip-makeup from the image and the color parameters of at least some of the plurality of reference lip-makeup products, and
      if at least one distance between the color parameters of the lip-makeup of the input image and one of the reference lip-makeup product is below a predetermined threshold, identifying a reference lip-makeup product best matching the lip-makeup product on the image,
   implemented by a system further comprising an advertisements database comprising a plurality of advertisement images associated with respective reference lip-makeup products, wherein the method comprises a preliminary step of determining whether the input image corresponds to an advertisement image contained in the advertisement database and, if so, identifying the lip-makeup product on the input image as the reference lip-makeup product associated to said advertisement image,
   wherein determining whether the input image corresponds to an advertisement database is performed by implementing a machine learning algorithm trained on a learning database comprising the advertisement images of the advertisement database and, for each advertisement image, a set of additional images artificially generated from the advertisement image by implementing at least one transformation of said advertisement image.

16. The lip-makeup identification method according to claim 15, wherein the transformations performed on each advertisement image for generating additional images are one or a combination of:
   geometric deformations,
   modified background layer,
   screen-like distorsion,
   addition of shadow or sun-flare,
   color deviation.

17. A lip-makeup identification system, comprising a computer and a memory storing, for each of a plurality of reference lip-makeup products, an identifier and color parameters, the lip-makeup identification system being configured to be capable of implementing the method according to claim 15.

* * * * *